us## United States Patent [19]

Kaido

[11] Patent Number: 6,060,552
[45] Date of Patent: May 9, 2000

[54] RUBBER COMPOSITION CONTAINING MODIFIED POLYISOBUTYLENE RUBBER

[75] Inventor: Hiroyuki Kaido, Hiratsuka, Japan

[73] Assignee: The Yokohama Rubber Co., Ltd., Tokyo, Japan

[21] Appl. No.: 09/165,314

[22] Filed: Oct. 2, 1998

[30]  Foreign Application Priority Data

Oct. 6, 1997 [JP]  Japan ..................................... 9-272756
Dec. 4, 1997 [JP]  Japan ..................................... 9-334071

[51] Int. Cl.$^7$ ....................................................... C08K 3/00
[52] U.S. Cl. ............................................. 524/492; 524/493
[58] Field of Search ..................................... 524/492, 493

[56]  References Cited

U.S. PATENT DOCUMENTS 5,475,051  12/1995  Machurat ................................ 524/519
5,679,728  10/1997  Kawazura et al. ...................... 523/215

FOREIGN PATENT DOCUMENTS 0 682 071 A1  11/1995  European Pat. Off. .
4-227741       8/1992   Japan .
7-304903       11/1995  Japan .
8-277347       10/1996  Japan .

*Primary Examiner*—Edward J. Cain
*Attorney, Agent, or Firm*—Arent Fox Kintner Plotkin & Kahn PLLC

[57]  ABSTRACT

A rubber composition containing a diene rubber and a modified polyisobutylene rubber having a functional group capable of reacting with a silanol group present on a surface of silica, together with a precipitated silica or a silica-adhered carbon black, having a tan δ at 60° C. of 0.2 or more.

20 Claims, No Drawings

RUBBER COMPOSITION CONTAINING MODIFIED POLYISOBUTYLENE RUBBER

BACKGROUND OF THE INVENTION

1. Filed of the Invention

The present invention relates to a rubber composition, especially a rubber composition for a tire tread containing a modified polyisobutylene rubber having an improved grip performance without substantially decreasing the abrasion resistance and the rolling resistance.

2. Description of the Related Art

Since butyl rubber, one of the polyisobutylene rubbers, has a high tan δ at 0° C., an improvement in the grip performance is expected. However, since the reinforcability with carbon black is poor, when used as a tire tread, the abrasion resistance is decreased. Further, since the tan δ at 60° C. is increased, the rolling resistance is deteriorated. Therefore, the butyl rubber is not substantially used for tire treads.

Japanese Unexamined Patent Publication (Kokai) No. 63-270751 discloses a technique for improving the grip of a tire tread by adding a specific carbon black to a rubber blend selected from at least 20% styrene-butadiene copolymer rubber, halogenated butyl rubber, etc. and also discloses that good results are obtained when silica is added, however, nothing is taught, regarding the synergistic effect of the combination of the three elements of a styrene-butadiene copolymer rubber, a halogenated butyl rubber, and silica. Further, no examples of the same are disclosed either. Further, Japanese Unexamined Patent Publication (Kokai) No. 4-227741, Japanese Unexamined Patent Publication (Kokai) No. 6-55040, etc. discloses silica-reinforced halogenated butyl rubbers, but the rubbers blended are natural rubbers and the effect thereof in the decrease of the tan δ at 60° C. is not taught. Further, Japanese Unexamined Patent Publication (Kokai) No. 7-304903 discloses a technique for improving the friction and the rolling resistance and abrasion resistance of tires by adding a specific halogenated isobutylene rubber to a silica-containing isoprene-butadiene copolymer rubber, but this publication teaches nothing about the conditions of the tan δ at 60° C. of 0.2 or more. Therefore, in examples where a halogenated polyisobutylene is added, the tan δ at 60° C. increases and the rolling resistance is decreased compared with the control formulation.

As explained above, polyisobutylene rubbers such as halogenated butyl rubber have a high tan δ at 0° C., which is correlated with the frictional force, when compared with diene rubbers such as natural rubber or styrene-butadiene copolymer rubber, and therefore, is effective for improving the grip performance when used for a tire tread. However, a polyisobutylene rubbers have the defects of being poor in bondability with carbon black, and therefore, reduction in the abrasion resistance and have the defects of being poor in the rolling resistance due to the high tan δ at 60° C., and therefore, has not been substantially used for actual tire treads.

SUMMARY OF THE INVENTION

Accordingly, the object of the present invention is to improve the defects of polyisobutylene rubbers, i.e., the abrasion resistance and the rolling resistance, while maintaining the advantages of the polyisobutylene rubbers.

Another object of the present invention is to eliminate the defective increase in the viscosity of a rubber composition of polyisobutylen rubber caused by the interaction of silica and polyisobutylene rubber in the unvulcanized rubber of the rubber composition.

In accordance with the present invention, there is provided a rubber composition comprising 100 parts by weight of a starting rubber containing 95 to 60 parts by weight of a styrene-butadiene copolymer rubber, 5 to 30 parts by weight of a modified polyisobutylene based rubber having a functional group capable of reacting with a silanol group present on a surface of silica, and optionally 0 to 20 parts by weight of another diene rubber and 5 to 100 parts by weight of precipitated silica, wherein a tan δ of the composition at 60° C. after vulcanization is at least 0.2.

In accordance with the present invention, there is further provided a rubber composition comprising a modified polyisobutyrene having a functional group capable of reacting with a silanol group present on a surface of silica and a silica-adhered carbon black.

DESCRIPTION OF THE PREFERRED EMBODIMENT

The term "polyisobutyrene" used herein means polyisobutylenes in narrow sence such as isobutylene homopolymer, halogenated butyl rubber, and copolymers of isobutylene with other monomers such as isoprene, p-methylstyrene.

Normally, carbon black is used for reinforcing rubber, but, as explained above, the use of carbon black is unsuitable for reinforcing a polyisobutylene rubber. Thus, according to the first aspect of the present invention, precipitated silica is used as a reinforcing agent. Precipitated silica has a large number of silanol groups on the surface thereof and can reinforce the rubber if a substituted group capable of reacting with the silanol group is introduced into the rubber. However, several ideas are required to realize this reinforcement for an actual rubber composition.

Therefore, the present inventor first considered that the strength of a polyisobutylene rubber alone was low and a blend thereof with a high strength diene rubber was necessary for use as a tire tread. However, since the diene rubber produces a combined product called filler gel in a mixer for mixing the starting rubber and powder such as carbon black and silica, the added silica tends to be incorporated into the diene rubber phase rather than the polyisobutylene rubber phase. Therefore, the silica present in the polyisobutylene rubber phase becomes small and the effect of improvement in the abrasion resistance is sometimes impaired.

From this viewpoint, the inventor researched how the silica is distributed between the diene rubber and the polyisobutylene rubber during the mixing and, as a result, found that the state of distribution differs depending upon the type of the rubber. That is, styrene-butadiene copolymer rubbers are most difficult to incorporate silica thereinto, natural rubbers are most easy to incorporate silica thereinto, and the other diene rubbers such as polybutadiene rubbers are positioned therebetween. Further, among the styrene-butadiene copolymer rubbers, those produced by emulsion polymerization are difficult to incorporate silica thereinto, compared with those produced by solution polymerization and, those having a large amount of styrene are difficult to incorporate silica thereinto compared with those having a small amount of styrene. Accordingly, it was learned that silica is distributed the most in the polyisobutylene rubber and the abrasion resistance improved when an emulsion-polymerized styrene-butadiene copolymer rubber is selected as the diene rubber for blending with a polyisobutylene rubber and that conversely only a small amount of silica is distributed in the polyisobutylene rubber and consequently the abrasion resistance is decreased, when blended with a natural rubber.

On the other hand, since a polyisobutylene rubber has a higher tan δ than an ordinary diene rubber, if the amount of the polyisobutylene rubber blended becomes higher, the tan δ at 60° C. becomes larger and the rolling resistance of the tire is increased. From the investigation of this phenomenon in more detail, it was learned that there is a close relationship with the tan δ of a formulation (reference formulation) blending in a polyisobutylene rubber. If the tan δ of the reference formulation is low, the addition of a polyisobutylene rubber increases the tan δ at 60° C., but if the tan δ is higher than a certain value, the tan δ at 60° C. is conversely decreased. Further, at the tan δ of the reference formulation of 0.2, the tan δ at 60° C. remains almost constant even if a polyisobutylene rubber is added. That is, an improvement in the rolling resistance of the tire is found by the polyisobutylene rubber at a tan δ at 60° C. of 0.2.

In this way, the inventor found that a tire tread had to be provided with the three properties of a good grip performance, rolling resistance, and abrasion resistance and that the following five conditions had to be satisfied in order for these to be achieved all at once, whereby the present invention has been completed.

(1) Blending in a styrene-butadiene copolymer rubber and keeping to a minimum other diene rubbers so that the silica will be distributed to the polyisobutylene rubber.

(2) Using precipitated silica so as to bond with the polyisobutylene rubber.

(3) Using a polyisobutylene rubber having a functional group capable of reacting with a silanol group incorporated thereinto so as to be bonded with the silica.

(4) Making the amount of the polyisobutylene rubber added not more than 30 parts by weight since it reacts with the silica during the mixing to increase the viscosity of the unvulcanized rubber or to decrease the strength of the vulcanized rubber.

(5) Making the rubber composition one having a tan δ at 60° C. of the vulcanized rubber of at least 0.2 so that the rolling resistance of the tire is decreased.

The styrene-butadiene copolymer rubber (SBR) which is blended into the rubber composition for a tire tread according to the first aspect of the present invention may include any styrene-butadiene copolymer rubber generally used for rubber in the past. These may be used alone or in any mixture thereof. To achieve the object of the present invention, an emulsion-polymerized SBR is more preferable than a solution-polymerized SBR. When using the two, it is preferable that the emulsion-polymerized SBR be present in an amount of at least half, preferably at least 70% by weight, of the total SBR. Further, while the content of the bound styrene in the SBR used is not particularly limited, to achieve the object of the present invention, it is preferable to use the content of the bound styrene is at least 30% by weight. Note that the ratio of the SBR in 100 parts by weight of the entire starting rubber is 95 to 60 parts by weight, preferably 85 to 70 parts by weight. Further, the glass transition temperature of the SBR is preferably −55° C. to −10°C.

The modified polyisobutylene rubbers blended into the rubber composition for a tire tread according to the first aspect of the present invention must be those having a functional group capable of reacting with a silanol group present on the surface of the silica (e.g., a halogen atom, an alkoxysilyl group, an acyloxy group, an amino group, etc.). The reacting group may be introduced by the method described, for example, on page 255 of the Rubber Industry Handbook (4th edition) (issued by The Society of Rubber Industry, Japan in 1994).

The modified polyisobutylene rubber used in the present invention is blended in an amount of 5 to 30 parts by weight, preferably 10 to 20 parts by weight, based upon 100 parts by weight of the total starting rubber. If the amount blended is more than 30 parts by weight, the decrease in the strength of the vulcanized rubber and the increase in the viscosity of the unvulcanized rubber are caused, and therefore, this is not preferable. Conversely, if the amount is less than 5 parts by weight, the effect of improvement in the frictional force becomes smaller, and therefore, this is also not preferred.

The starting rubber of the rubber composition for a tire tread of the present invention may contain another diene rubber (e.g., natural rubbers, polyisoprene rubbers, polybutadiene rubbers, styrene-isoprene copolymer rubbers, and butadiene-styrene-isoprene copolymer rubbers) blended therein, but when blending these diene rubbers, the maximum amount blended is 20 parts by weight based upon 100 parts by weight of the starting rubber. If the amount blended is more than 20 parts by weight, there are cases where the silica will not be distributed well in the modified polyisobutylene rubber, and therefore, this is not preferable.

The silica blended as a reinforcing agent in the rubber composition for a tire tread according to the first aspect of the present invention is any precipitated silica blended into rubber compositions for tire treads in the past. As such a precipitated silica, it is possible to use a commercially available product (for example, Nipsil AQ of Nippon Silica Industrial or organic silane treated forms of the same etc.) The amount blended is 5 to 100 parts by weight, preferably 10 to 40 parts by weight, based upon 100 parts by weight of the starting rubber. If the amount blended is too small, the object of the present invention cannot be achieved, while conversely if more than 100 parts by weight, the hardness of the tire tread becomes too high, and therefore, these are not preferable.

The rubber composition for a tire tread according to the first aspect of the present invention may further contain therein, in addition to the above essential ingredients, ordinary carbon black. When blending in carbon black, the amount blended is preferably 5 to 80 parts by weight, based upon 100 parts by weight of the starting rubber.

The rubber composition for a tire tread of the present invention may further contain therein a silane coupling agent. As the silane coupling agent, any silane coupling agent used for rubber compositions in the past may be used. The examples thereof are shown in Table I.

As the silane coupling agent used for the silica-containing rubber composition for a tire tread according to the present invention, any silane coupling agent used also as a silica filler in the past. The typical examples are as follows. Among these, bis-[3-(triethoxysilyl)-propyl]tetrasulfide is the most preferred from the viewpoint of the processability.

TABLE I

| Chemical name | Structural formula |
| --- | --- |
| Vinyltrimethoxysilane | $CH_2\!=\!CHSi(OCH_3)_3$ |
| Vinyltriethoxysilane | $CH_2\!=\!CHSi(OCH_2CH_3)_3$ |
| Vinyltris(2-methoxyethoxy)silane | $CH_2\!=\!CHSi(OCH_2CH_2OCH_3)_3$ |
| N-(2-aminoethyl)3-aminopropylmethyldimethoxysilane | $H_2NCH_2CH_2NH(CH_2)_3\underset{\underset{CH_3}{\mid}}{Si}(OCH_3)_2$ |
| N-(2-aminoethyl)3-aminopropyltrimethoxysilane | $H_2NCH_2CH_2NH(CH_2)_3Si(OCH_3)_3$ |
| 3-aminopropyltrimethoxysilane | $H_2N(CH_2)_3Si(OCH_3)_3$ |
| 3-glycidoxypropyltrimethoxysilane | $\underset{O}{CH_2\!-\!\!-\!\!CH}CH_2O(CH_2)_3Si(OCH_3)_3$ |
| 3-glycidoxypropylmethyldimethoxysilane | $\underset{O}{CH_2\!-\!\!-\!\!CH}CH_2O(CH_2)_3\underset{\underset{CH_3}{\mid}}{Si}(OCH_3)_2$ |
| 2-(3,4-epoxycyclohexyl)ethyltrimethoxysilane | 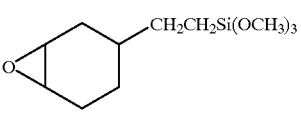 |
| 3-metacryloxypropyltrimethoxysilane | $CH_2\!=\!\underset{\underset{CH_3}{\mid}}{C}CO_2(CH_2)_3Si(OCH_3)_3$ |
| 3-mercaptopropyltrimethoxysilane | $HS(CH_2)_3Si(OCH_3)_3$ |
| 3-aminopropyltriethoxysilane | $H_2N(CH_2)_3Si(OCH_2CH_3)_3$ |
| bis-[3-(triethoxysilyl)propyl]tetrasulfide | $[(CH_3CH_2O)_3Si(CH_2)_3]_2\!-\!S_4$ |

The amount of the silane coupling agent blended in the present invention is preferably 30% by weight or less, more preferably 2 to 20% by weight, based upon the amount of silica blended. Blending with a silane coupling agent improves the abrasion resistance of the vulcanized rubber and lowers the viscosity of the unvulcanized rubber. Note that, if the amount of the silane coupling agent blended is too large, the scorch time of the unvulcanized rubber becomes shorter and scorching easily occurs, and therefore, this is not preferable.

According to a second aspect of the present invention, a silica-adhered carbon black is used as a reinforcing agent. As mentioned above, according to the second aspect of the present invention, there is provided a rubber composition comprising a modified polyisobutylene having a functional group capable of reacting with a silanol group present on a surface of a silica-adhered carbon black.

Further, according to the second aspect of the present invention, there are provided rubber compositions characterized in that:

said modified polyisobutylene is an isoprene-isobutylene copolymer rubber having a halogen group and/or an isobutylene-p-methylstyrene copolymer rubber having a halogen atom;

the amount of silica deposited of said silica-adhered carbon black is 0.1 to 25% by weight;

100 parts by weight of a rubber composed of at least 5 parts by weight of said modified polyisobutylene and the remainder of a diene rubber is used as the starting rubber;

both the silica-adhered carbon black and another reinforcing agent are used as a reinforcing agent;

further including at least one silane coupling agent;

further including at least one polyalkylsiloxane and/or polysiloxane having an alkoxy group; and the tan δ of the composition at 60° C. after vulcanization is at least 0.2.

A polyisobutylene rubber such as a halogenated butyl rubber has a higher tan δ at 0° C., which is correlated with the frictional force, than diene rubbers such as a natural rubber or styrene-butadiene copolymer rubber, and therefore, use thereof for a tire tread would be effective for improving the grip performance. However, a polyisobutylene rubber has the defects of being poor in bondability with carbon black and therefore a decrease in the abrasion resistance and the defects of being poor in the rolling resistance due to the high tan δ at 60° C., and therefore, has not been substantially used for actual tire treads.

Further, combination of a halogenated butyl rubber and silica vastly improves the tan δ at 0° C., but silica has the defect of reacting with the halogenated butyl rubber in the unvulcanized state, and therefore, the viscosity of the rubber is increased.

Therefore, the present invention is characterized in that the basic polyisobutylene rubber, i.e., the polyisobutylene, is modified to a modified polyisobutylene rubber having a functional group capable of reacting with the silanol group present on the surface of silica, while, as a reinforcing agent, a reinforcing agent combining carbon black and silica, that is, a silica-adhered carbon black is prepared as a carbon black reinforcing agent having silica on the surface thereof, then the silica-adhered carbon black is added to and mixed with the modified polyisobutylene rubber so as to bond the silica portion of the silica-adhered carbon black and the modified functional group portion of the modified polyisobutylene rubber with each other. This technical means is used to solve the above problems in the prior art all at once.

The modified polyisobutylene rubber used for the basic rubber of the rubber composition of the present invention is a polyisobutylene rubber including polyisobutylene and isobutylene copolymers having a functional group capable of reacting with the silanol group present on the surface of silica, for example, a halogen atom, an alkoxysilyl group, an acyloxy group, or an amino group. This reacting group may be introduced by the method described, for example, on page 255 of the *Rubber Industry Handbook* (4th edition) (issued by The Society of Rubber Industry, Japan in 1994). Particularly useful as the modified polyisobutylene rubber in the present invention are isobutylene-isoprene copolymer rubber having a halogen atom and isobutylene-paramethylstyrene copolymer rubber having a halogen atom.

For the starting rubber in the rubber composition of the present invention, it is possible to use the modified polyisobutylene rubber in an amount of 100 parts by weight. Further, it is possible to use the modified polyisobutylene in any amount of 5 parts by weight or more, based upon 100 parts by weight of the starting rubber. If the amount of the modified polyisobutylene rubber blended is less than 5 parts by weight, the desired action and effect are not achieved, and therefore, this is not preferred.

The rubber which may be blended in the rubber composition of the present invention as another rubber ingredient other than the modified polyisobutylene rubber may be any diene rubber selected from, for example, natural rubbers (NR), polyisoprene rubbers (IR), styrene-butadiene copolymer rubbers (SBR), polybutadiene rubbers (BR), butyl rubbers (IIR), and acrylonitrile butadiene rubbers (NBR). When blending in these diene rubbers, the amount which may be blended is less than 95 parts by weight in 100 parts by weight of the starting rubber. If the amount blended is more than 95 parts by weight, no substantial effect of improvement in the physical properties by the modified polyisobutylene rubber is obtained, and therefore, this is not desirable.

The silica-adhered carbon black used as a reinforcing agent in the rubber composition of the present invention can be obtained by, for example, producing and depositing silica on all or part of the surface of carbon black. Basically the silica-adhered carbon black can be produced by placing carbon black in a gas phase or liquid phase under suitable conditions for production of silica. The conditions for production of silica used for adhesion of the silica are, for example, hydrolysis of tetraethoxysilane, heat decomposition of polyalkoxysiloxane, neutralization of water glass, and drying of a colloidal silica aqueous solution. The silica may be deposited in the process of growth of the carbon black particles in a furnace. The carbon black produced may be treated later as well. As specific processes, a carbon producing furnace, granulator, wet master batch coagulation vessel, etc. may be mentioned. As known processes, Japanese Unexamined Patent Publication (Kokai) No. 8-277347 and International Publication WO96/37547 may be exemplified.

As the carbon black used as the starting substance of the silica-adhered carbon black in the second aspect of the present invention, it is possible to use any carbon black which has been generally used in the past for other rubber compositions for tire use to exhibit the effect of reinforcement of the rubber. A preferable carbon black is the SRF grade to the SAF grade with a nitrogen specific area of 25 to 250 $m^2/g$. These may be used and may be blended together depending upon the application of the rubber composition.

The amount of the silica in the silica-adhered carbon black according to the second aspect of the present invention is preferably 0.1 to 25% by weight in view of the dispersibility in the rubber composition of the present invention and in order to achieve the desired action and effect of the present invention.

The silica-adhered carbon black according to the second aspect of the present invention is preferably blended in an amount of 10 to 200 parts by weight, more preferably 15 to 150 parts by weight, based upon 100 parts by weight of the rubber components. If the amount blended is too small, the rubber cannot be sufficiently reinforced, and therefore, the abrasion resistance etc., for example, become poor. Conversely, if the amount is too large, the hardness becomes too high, the processability becomes poor, and the practical value of the modified polyisobutylene rubber material becomes poor, and therefore, this is not desirable. The rubber composition may also contain, in addition to the above silica-adhered carbon black, any carbon black and/or silica normally used in rubber compositions in a range of up to 80 parts by weight, based upon 100 parts by weight of the starting rubber.

The rubber composition of the second aspect of the present invention may further contain therein, in addition to the above components, one or more types of any silane coupling agent. The silane coupling agent usable is any silane coupling agent used for rubber compositions in the past. For example, those disclosed in Table I above may be mentioned. Further, as the polysiloxane, there are the various types such as described, for example, in Japanese Unexamined Patent Publication (Kokai) No. 9-111044, Japanese Unexamined Patent Publication (Kokai) No. 9-194641, and Japanese Unexamined Patent Publication (Kokai) No. 9-194638, but those having a high melting point and both an alkoxy group and alkyl group are preferred.

The amount of the silane coupling agent and the polysiloxane blended in the present invention is not more than 20 parts by weight, preferably 0.3 to 10 parts by weight, based upon 100 parts by weight of the starting rubber. The blending of the silane coupling agent and polysiloxane improves the abrasion resistance of the vulcanized rubber and decreases the viscosity of the unvulcanized rubber. Note that, if the amount of the silane coupling agent blended is too large, the scorch time of the unvulcanized rubber becomes shorter and scorching easily occurs, and therefore, this is not preferable.

The polyisobutylene rubber used in the present invention is higher in the tan $\delta$ than ordinary diene rubber, and therefore, when the amount of the rubber blended becomes larger, the tan $\delta$ at 60° C. becomes larger and the rolling resistance of the tire is decreased. Investigating this phenomenon in more detail, it was learned that there is a close relationship with the tan $\delta$ of a formulation (reference formulation) of a blend with a polyisobutylene rubber. If the tan & of the reference formulation is low, the addition of a polyisobutylene rubber increases the tan $\delta$ at 60° C., but if higher than a certain value, it conversely is decreased. Further, at a tan $\delta$ of the reference formulation of 0.2, the tan $\delta$ at 60° C. remains almost constant even if a polyisobutylene rubber is added. That is, an improvement in the rolling resistance of the tire is obtained by the polyisobutylene rubber at a tan $\delta$ at 60° C. of 0.2. Therefore, in rubber formulations requiring blending of the modified polyisobutylene rubber and the silica-adhered carbon black of the present invention, it is preferred that the tan $\delta$ at 60° C. of the vulcanized physical properties is at least 0.2 in obtaining the rubber composition of the present invention exhibiting the improved desired action and effects.

The rubber composition according to both the first and second aspects of the present invention may have further contain therein, in addition to the above essential ingredients, various additives generally used in conventional rubber compositions, for example, a vulcanization or cross linking agent, a vulcanization or cross-linking accelerator, various types of oils, an antioxidant, plasticizer, etc. The formulations may be mixed and vulcanized by general methods to form a composition and used for vulcanization or cross-linking. The amounts of the additives blended may be the amounts generally blended in the past so long as they do not run counter to the objects of the present invention.

EXAMPLES

The present invention will now be explained further in detail by, but is not limited to, the following Examples.

Standard Examples I-1 to I-4. Examples I-1 to I-3, and Comparative Examples I-1 to I-4

In the formulations shown in Tables II to V, the ingredients other than the zinc oxide, vulcanization accelerator, and sulfur were mixed in a 1.8 liter internal mixer for 3 to 5 minutes. The mixture was discharged when reaching 165±5° C. The remaining compounding agents were mixed with this master batch by an 8 inch open roll to obtain the rubber composition. Next, the rubber composition thus obtained was press vulcanized in a 15×15×0.2 cm mold at 160° C. for 20 minutes to prepare a test piece (rubber sheet) which was used for evaluation of the vulcanized physical properties.

TABLE II

|  | Standard Ex. I-1 | Comp. Ex. I-1 |
| --- | --- | --- |
| Formulation (parts by weight) | | |
| Natural rubber*1 | 100 | 50 |
| Brominated butyl rubber*2 | — | 50 |
| Carbon black HAF*3 | 50 | 50 |
| Stearic acid | 2 | 2 |
| Antioxidant 6C*4 | 2.15 | 2.15 |
| Wax*5 | 1 | 1 |
| Zinc oxide | 3 | 3 |
| 5% oil treated sulfur*6 | 1.7 | 1.7 |
| Vulcanization accelerator NS*7 | 0.7 | 0.7 |
| Physical properties | | |
| Wet μ | 1.02 | 1.2 |
| tan δ (60° C.) | 0.127 | 0.153 |
| tan δ (60° C.) (index) | (100) | (120) |
| Abrasion resistance (index) | 100 | 81 |
| Wet μ (index) | 100 | 118 |
| Abrasion resistance (index)/ tan δ (60° C.) (index) | 100 | 68 |

*1: RSS#3
*2: BROMOBUTIL 2244, made by EXXON CHEMICAL
*3: Seast KH, made by Tokai Carbon
*4: Nocrack 6C, made by Ouchi Shinko Chemical Industrial
*5: Microcrystalline wax
*6: Powder sulfur, 5% paraffin oil treated
*7: Noccelar NS, made by Ouchi Shinko Chemical Industrial

TABLE III

|  | Standard Ex. I-2 | Comp. Ex. I-2 |
| --- | --- | --- |
| Formulation (parts by weight) | | |
| Natural rubber*1 | 100 | 50 |
| Brominated butyl rubber*1 | — | 50 |
| Carbon black HAF*1 | 25 | 25 |

TABLE III-continued

|  | Standard Ex. I-2 | Comp. Ex. I-2 |
| --- | --- | --- |
| Precipitated silica*2 | 30 | 30 |
| Silane coupling agent*3 | 3 | 3 |
| Diethylene glycol | 3 | 3 |
| Stearic acid | 2 | 2 |
| Antioxidant 6C*1 | 2.15 | 2.15 |
| Wax*1 | 1 | 1 |
| Zinc oxide | 3 | 3 |
| 5% oil treated sulfur | 1.7 | 1.7 |
| Vulcanization accelerator NS*1 | 0.7 | 0.7 |
| Vulcanization accelerator DPG*4 | 0.5 | 0.5 |
| Physical properties | | |
| Wet μ | 1.03 | 1.2 |
| tan δ (60° C.) | 0.127 | 0.142 |
| tan δ (60° C.) (index) | (100) | (112) |
| Abrasion resistance (index) | 100 | 80 |
| Wet μ (index) | 100 | 117 |
| Abrasion resistance (index)/ tan δ (60° C.) (index) | 100 | 71 |

*1: See Remarks of Table II
*2: Nipsil AQ, made by Nippon Silica
*3: Si69, made by Degussa
*4: Vulkacit D, made by Bayer

TABLE IV

|  | Standard Ex. I-3 | Ex. I-1 | Ex. I-2 | Comp. Ex. I-3 | Comp. Ex. I-4 |
| --- | --- | --- | --- | --- | --- |
| Formulation (parts by weight) | | | | | |
| Styrene-butadiene copolymer rubber*1 | 100 | 90 | 80 | 90 | 80 |
| Brominated butyl rubber*2 | — | 10 | 20 | — | — |
| Polyisobutylene*3 | 10 | 20 | | 20 | 20 |
| Precipitated silica*4 | 20 | 20 | 20 | 20 | 20 |
| Carbon black HAF*1 | 40 | 40 | 40 | 40 | 40 |
| Antioxidant 6C*1 | 3 | 3 | 3 | 3 | 3 |
| Wax*1 | 1 | 1 | 1 | 1 | 1 |
| Stearic acid | 1 | 1 | 1 | 1 | 1 |
| Silane coupling agent*4 | 2 | 2 | 2 | 2 | 2 |
| Diethylene glycol | 1 | 1 | 1 | 1 | 1 |
| Aromatic process oil | 10 | 10 | 10 | 10 | 10 |
| Zinc oxide | 5 | 5 | 5 | 5 | 5 |
| Vulcanization accelerator CZ*5 | 1 | 1 | 1 | 1 | 1 |
| Vulcanization accelerator DPG*4 | 0.3 | 0.3 | 0.3 | 0.3 | 0.3 |
| 5% oil treated sulfur | 2.1 | 2.1 | 2.1 | 2.1 | 2.1 |
| Physical properties | | | | | |
| Wet μ | 1.1 | 1.15 | 1.17 | 1.14 | 1.16 |
| tan δ (60° C.) | 0.206 | 0.202 | 0.202 | 0.221 | 0.234 |
| tan δ (60° C.) (index) | (100) | (98) | (98) | (107) | (114) |
| Abrasion resistance (index) | 100 | 98 | 98 | 91 | 70 |
| Wet μ (index) | 100 | 105 | 106 | 104 | 105 |
| Abrasion resistance (index)/tan δ (60° C.) (index) | 100 | 100 | 100 | 85 | 61 |

*1: Nipol 1502 (styrene 24.5%), made by Nippon Zeon
*2: See Remarks of Table II
*3: Vistanex L-140, made by Shell Chemical
*4: Si 69, made by Degussa
*5: Noccelar CZ, made by Ouchi Shinko Chemical Industrial

TABLE V

| | Standard Ex. I-4 | Ex. I-3 | Standard Ex. I-5 | Standard Ex. I-6 |
|---|---|---|---|---|
| Formulation (parts by weight) | | | | |
| Emulsion polymerized styrene-butadiene copolymer rubber-1*1 | 105 | 97.5 | 105 | 97.5 |
| Solution polymerized styrene-butadiene copolymer rubber-2*2 | 36 | 30 | 36 | 30 |
| Brominated p-methyl styrene-isobutylene copolymer rubber*3 | — | 10 | — | 10 |
| Silica*4 | 20 | 20 | 80 | 80 |
| Carbon black HAF*5 | 60 | 60 | — | — |
| Silane coupling agent*6 | 1 | 1 | 1 | 1 |
| Aromatic process oil | 6.5 | 10 | 6.5 | 10 |
| Stearic acid | 1 | 1 | 1 | 1 |
| Antioxidant 6C*6 | 1 | 1 | 1 | 1 |
| Wax*6 | 1 | 1 | 1 | 1 |
| Zinc oxide | 3 | 3 | 3 | 3. |
| 5% oil extended sulfur | 2 | 2 | 2 | 2 |
| Vulcanization accelerator CZ*7 | 1.5 | 1.5 | 1.5 | 1.5 |
| Vulcanization accelerator DPG*6 | 1 | 1 | 1 | |
| Physical properties | | | | |
| Wet $\mu$ | 1.2 | 1.25 | 1.18 | 1.21 |
| tan $\delta$ (60° C.) | 0.244 | 0.232 | 0.183 | 0.187 |
| Abrasion resistance (index) | 100 | 102 | 101 | 98 |

*1: Nipol 9828 (styrene 33.7%, 33.3% aromatic oil extended), made by Nippon Zeon
*2: Tufden 1524 (styrene 18.4%, 16.7% aromatic oil extended), made by Asahi Chemical.
*3: Exxpro 89-4, made by Exxon Chemical
*4: Nipsil AQ, made by Nippon Silica
*5: Seast KH, made by Tokai Carbon
*6: Same as shown in Table III
*7: Same as shown in Table III The methods of evaluation of the vulcanized physical properties were as follows:

tan $\delta$ (60° C.)

A viscoelasticity spectrometer made by Iwamoto Seisakusho was used to determine the tan $\delta$ at 60° C. under conditions of elongation deformation at a strain of 10±2% and a frequency of 20 Hz.

Abrasion resistance

A Lambourn abrasion tester (made by Iwamoto Seisakusho) was used to determine the amount of abrasion loss under conditions of a temperature of 20° C. and a slip rate of 50%. The result was indexed to the standard example as 100. The larger the value, the better the abrasion resistance shown.

Wet road friction coefficient (wet $\mu$)

A British Portable Skid Tester was used to determine this on a wet safety walk at room temperature. The value (BPN) obtained was converted to the frictional coefficient (wet $\mu$) by the following formula:

$$\text{Wet } \mu = (3 \times \text{BPN})/(330 - \text{BPN})$$

As is clear from the evaluation results in Table II, the formulations of Standard Example I-1 and Comparative Example I-1 are examples of use of brominated butyl rubber for the isobutylene rubber and addition of the same to a natural rubber/carbon black formulation. Compared to Standard Example I-1, Comparative Example I-1 was improved in the wet $\mu$, an indicator of the grip force, but was poor in the tan $\delta$ (60° C.), an indicator of the rolling resistance, and the abrasion resistance, making it unpractical.

As is clear from the results of Table III, the formulations of Standard Example I-2 and Comparative Example I-2 are the formulations of Table II plus silica. However, even with these formulations the tan $\delta$ (60° C.) and the abrasion resistance are poor.

As is clear from the results of Table IV, among the formulations of Standard Example I-3, Examples I-1 and I-2, and Comparative Examples I-3 to I-4, Examples I-1 to I-2 are examples of addition of brominated butyl rubber to Standard Example I-3. An improvement in the wet $\mu$ and the tan $\delta$ (60° C.) was observed and the abrasion resistance was the same. On the other hand, Comparative Examples I-3 and I-4, to which were added polyisobutylene not having a substituent group reactive with silica, suffered from declines in the tan $\delta$ (60° C.) and abrasion resistance and were therefore not practical.

The formulations of Standard Examples I-4 to I-6 and Example I-3 shown in Table V exhibited the effect of a high tan $\delta$ (60° C.) system more than the formulations of Examples I-1 and I-2. Compared with the formulation of Standard Example I-4, Example I-3 was improved in each of the wet $\mu$, tan $\delta$ (60° C.), and abrasion resistance. On the other hand, even if a polyisobutylene rubber is added to the formulation of Standard Example I-5 in which the amount of silica is increased to decrease the tan $\delta$ (60° C.) of the system, that is, even with the formulation of Standard Example I-6, the tan $\delta$ (60° C.) is not improved.

As explained above, according to the first aspect of the present invention, by blending precipitated silica into the starting rubber containing a styrene-butadiene copolymer rubber and a modified polyisobutylene rubber having a functional group capable of reacting with a silanol group present on the surface of the silica so as to make the tan $\delta$ (60° C.) after vulcanization at least 0.2, it is possible to increase the frictional force with a wet road surface and improve the grip performance, without substantially reducing the abrasion resistance and rolling resistance of the tire tread.

The Examples of the second aspect of the present invention will now be further explained.

The silica-adhered carbon black 1 and the silica-adhered carbon black 2 used in the following formulations were prepared as follows.

Silica-Adhered Carbon Black 1

The following method was used to prepare silica-adhered carbon black containing 0.5% silica.

100 g of commercially available carbon black (Dia Black H) was added to 2 liters of distilled water. This was shaken vigorously for 30 minutes to form a carbon black slurry. This was given a final content of $SiO_2$ of 0.5% by weight using JIS No. 1 sodium silicate and was adjusted by distilled water, sodium hydroxide, and sulfuric acid to a pH 10 to form a mixture of a sol type water dispersed silica and carbon black. This mixture was aged at 90° C. at pH 7 for 10 hours while stirring and then dried and pulverized.

Silica-Adhered Carbon Black 2

A silica-adhered carbon black containing 3% silica was prepared by the following method:

Commercially available water dispersed silica (Showtex-30, made by Nissan Chemical) was mixed with distilled water and sulfuric acid to give an aqueous solution of pH 7 containing 3% by weight of $SiO_2$. 1000 g of commercially available carbon black (Dia Black N339 by Mitsubishi Chemical) was charged into an internal mixer warmed to 80°

C. 1000 ml of the prepared aqueous solution of the water dispersed silica was immediately poured thereto and stirred continuously at 80° C. until forming bead-like granules having 2 to 5 mm size. These were dried at 105° C.

The polysiloxane 1 used for the following formulations was synthesized by the following method:

Polysiloxane 1

200 g of polymethylhydrogen siloxane (KF99, made by Shinetsu Chemical) and 120 g of ethanol were mixed, then 40 μl of a 1% isopropyl alcohol solution of Chloroplatinic acid hexahydrate was added. This was reacted at 80° C. for 10 hours to synthesize the compound. The estimated structure of the compound is shown below, where, m:n=21:79, and m+n=30.

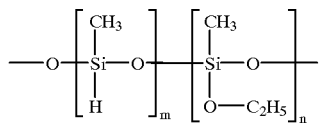

As the other ingredients used for the following formulations, the following commercially available products were used:

Modified polyisobutylene (1) . . . EXXPRO 89-4, made by Exxon Chemical

Modified polyisobutylene (2) . . . BROMOBUTIL 2244, made by Exxon Chemical

Oil extended SBR (1) . . . Nipol 1712 (oil content 27.27%) made by Nippon Zeon

Oil extended SBR (2) . . . Nipol 9528R (oil content 27.27%) made by Nippon Zeon

Oil extended SBR (3) . . . Tufden 1534 (oil content 27.27%) made by Asahi Chemical Polyisobutylene (1) . . . ESSO BUTYL 268, made by Esso Chemical Carbon black (1) . . . Dia Black H, made by Mitsubishi Chemical Carbon black (2) . . . Dia Black N339, made by Mitsubishi Chemical Silica (1) . . . Nipsil AQ, made by Nippon Silica Industrial Silane coupling agent (1) . . . bis-[3-(triethoxysilyl)-propyl]tetrasulfide Silane coupling agent (2) . . . di[3-(triethoxysilyl)propyl] amine Antioxidant 6C . . . Antigene 6C, made by Sumitomo Chemical Industry Vulcanization accelerator CZ . . . Noccelar CZ-G, made by Ouchi Shinko Chemical Industrial Vulcanization accelerator DPG . . . Noccelar D, made by Ouchi Shinko Chemical Industrial Vulcanization accelerator NS . . . Noccelar NS-F, made by Ouchi Shinko Chemical Industrial Preparation of Sample The ingredients other than the vulcanization accelerator and sulfur were mixed in a 1.8 liter capacity internal mixer for 3 to 5 minutes. The mixture was discharged when reaching 165±5° C. The vulcanization accelerator and sulfur were mixed with this master batch by an 8 inch open roll to obtain the rubber composition. The unvulcanized viscosity (Mooney viscosity) of the rubber composition obtained was measured.

Next, the rubber composition was press vulcanized in a 15×15×0.2 cm mold at 160° C. for 20 minutes to prepare a test piece (rubber sheet) and the tan δ at 0° C. and 60° C. of the vulcanized physical properties were determined.

The test methods of the unvulcanized physical properties and the vulcanized physical properties of the compositions obtained in the Examples were as follows:

Unvulcanized Physical Properties

Mooney viscosity: Measured based on JIS K 6300 at 100° C.

Vulcanized Physical Properties tan δ (0° C., 60° C.): A Rheograph Solid made by Toyo Seiki was used to determine the viscoelasticity at an initial strain of 10%, a dynamic strain of 2%, and a frequency of 20 Hz (test sample width: 5 mm).

Standard Example II-1, Example I-1, and Comparative Example II-1

These examples are examples showing the results of evaluation of systems using only modified polyisobutylene rubber for the stock rubber and blending three different types of reinforcing agents. The results are shown in Table VI.

TABLE VI

|  | Standard Ex. II-1 | Comp. Ex. II-1 | Ex. II-1 |
|---|---|---|---|
| Formulation (wt part) |  |  |  |
| Modified polyisobutylene (1) | 100 | 100 | 100 |
| Carbon black (1) | 60 | — | — |
| Silica (1) | — | 60 | — |
| Silica-adhered carbon black 1 | — | — | 60 |
| Silane coupling agent (1) | 3 | 3 | 3 |
| Zinc oxide | 0.5 | 0.5 | 0.5 |
| Stearic acid | 2 | 2 | 2 |
| Zinc stearate | 1 | 1 | 1 |
| Test results |  |  |  |
| Unvulcanized viscosity (Mooney viscosity) | 106 | 139 | 103 |
| tan δ (0° C.) | 0.861 | 0.822 | 0.883 |
| tan δ (60° C.) | 0.201 | 0.131 | 0.149 |

Standard Example II-1 is an example of addition of carbon black as a reinforcing agent to modified polyisobutylene. Comparative Example II-1, where the carbon black was changed to silica, exhibits the effect of reducing the tan δ (60° C.), which is an indicator of the rolling resistance of the tire, but has the defect that the silica causes a major increase in the unvulcanized viscosity and a decrease in the processability since the rubber gels.

As opposed to this, Example II-1 of the present invention using a silica-adhered carbon black as the reinforcing agent was found to have a lower tan δ (60° C.) than Standard Example II-1 and no increase in the unvulcanized viscosity.

Standard Example II-2, Example II-2, and Comparative Example II-2

These Examples show the results of evaluation of systems using blends of SBR and modified polyisobutylene rubber as the starting rubber and blending into these carbon black and silica or silica-adhered carbon black as reinforcing agents. The results are shown in Table VII.

TABLE VII

|  | Standard Ex. II-2 | Ex. II-2 | Comp. Ex. II-2 |
|---|---|---|---|
| Formulation (parts by weight) |  |  |  |
| Oil extended SBR (1) | 110 | 110 | 110 |
| Modified polyisobutylene (2) | 20 | 20 | — |
| Polyisobutylene (1) | — | — | 20 |

TABLE VII-continued

|  | Standard Ex. II-2 | Ex. II-2 | Comp. Ex. II-2 |
|---|---|---|---|
| Carbon black (2) | 60 | 60 | 60 |
| Silica (1) | 20 | — | — |
| Silica-adhered carbon black 1 | — | 20 | 20 |
| Silane coupling agent (1) | 1 | 1 | 1 |
| Diethylene glycol | 1 | 1 | 1 |
| Stearic acid | 1 | 1 | 1 |

TABLE VII-continued

|  | Standard Ex. II-2 | Ex. II-2 | Comp. Ex. II-2 |
|---|---|---|---|
| Antioxidant 6C | 3 | 3 | 3 |
| Microcrystalline wax | 1 | 1 | 1 |
| Aromatic process oil | 8 | 8 | 8 |
| Zinc oxide | 5 | 5 | 5 |
| Powdered sulfur | 2 | 2 | 2 |
| Vulcanization accelerator CZ | 1.4 | 1.4 | 1.4 |
| Vulcanization accelerator DPG | 0.2 | 0.2 | 0.2 |
| Test results |  |  |  |
| Unvulcanized viscosity (Mooney viscosity) | 70 | 64 | 63 |
| tan δ (0° C.) | 0.565 | 0.571 | 0.551 |
| tan δ (60° C.) | 0.254 | 0.25 | 0.275 |

Standard Example II-2 is an Example of use of a blend of styrene-butadiene copolymer rubber (SBR) and modified polyisobutylene as the starting rubber and use of a blend of carbon black and silica for the reinforcing agent. Example II-2 of the present invention in which this silica was changed to silica-adhered carbon black exhibited a reduced unvulcanized viscosity, a large tan δ (0° C.), which is an indicator of the frictional force on wet roads, and a low tan δ (60° C.).

On the other hand, Comparative Example II-2 which replaces the modified polyisobutylene of Example II-2 with an ordinary unmodified polyisobutylene did not increase in unvulcanized viscosity, but was increased in tan δ (60° C.) so was found to be not desirable.

Standard Example II-3, Examples II-3 to II-6, and Comparative Example II-3

These Examples show the results of evaluation of systems using blends of natural rubber and modified polyisobutylene rubber as the starting rubber and blending into these carbon black or silica-adhered carbon black reinforcing agents. The results are shown in Table VIII.

TABLE VIII

|  | Standard Ex. II-3 | Ex. II-3 | Ex. II-4 | Ex. II-5 | Ex. II-6 | Comp. Ex. II-3 |
|---|---|---|---|---|---|---|
| Formulation (parts by weight) |  |  |  |  |  |  |
| Natural rubber (RSS#1) | 50 | 50 | 50 | 50 | 50 | 100 |
| Modified polyisobutylene (2) | 50 | 50 | 50 | 50 | 50 | — |
| Carbon black (1) | 50 | — | — | — | — | 50 |
| Silica-adhered carbon black 2 | — | 50 | 50 | 50 | 50 | — |
| Silane coupling agent (1) | — | — | 3 | — | 1.5 | — |
| Silane coupling agent (2) | — | — | — | 3 | — | — |
| Polysiloxane 1 | — | — | — | — | 1.5 | — |
| Stearic acid | 1 | 1 | 1 | 1 | 1 | 1 |
| Antioxidant 6C | 1 | 1 | 1 | 1 | 1 | 1 |
| Powdered sulfur | 1.5 | 1.5 | 1.5 | 1.5 | 1.5 | 1.5 |
| Vulcanization accelerator CZ | 1 | 1 | 1 | 1 | 1 | 1 |
| Zinc oxide | 3 | 3 | 3 | 3 | 3 | 3 |
| Test results |  |  |  |  |  |  |
| Unvulcanized viscosity (Mooney viscosity) | 116 | 111 | 102 | 120 | 105 | 108 |
| tan δ (0° C.) | 0.571 | 0.573 | 0.553 | 0.577 | 0.58 | 0.247 |
| tan δ (60° C.) | 0.151 | 0.14 | 0.122 | 0.129 | 0.127 | 0.12 |

Standard Example II-3 is an Example of use, of a blend of natural rubber and modified polyisobutylene as the starting rubber and use of carbon black as the reinforcing agent. The fact that Example II-3 of the present invention, in which this reinforcing agent is changed to a silica-adhered carbon black, is improved in the tan δ (0° C.) and the tan δ (60° C.) without causing an increase in the unvulcanized viscosity is the same as in Tables VI and VII.

Examples II-4 and II-5, which additionally add a silane coupling agent thereto, featured a further lower tan δ (60° C.) and were preferable as tire tread rubber. Further, Example II-6 of the present invention, which replaced part of the silane coupling agent with polysiloxane 1, exhibited similar properties to Examples II-4 and II-5. Note that Comparative Example II-3 composed of an ordinary diene rubber and carbon black had a low tan δ (60° C.), but also a low tan δ (0° C.) and an inferior grip.

Standard Examples II-4 to II-6, Example II-7, and Comparative Examples II-4 to II-5

These Examples show the results of evaluation of systems using blends of two types of SBR and blends of these two types of SBR and modified polyisobutylene rubber as the starting rubber and blending three types of reinforcing agents thereinto. The results are shown in Table IX.

TABLE IX

| | Standard Ex. II-4 | Standard Ex. II-5 | Standard Ex. II-6 | Comp. Ex. II-4 | Comp. Ex. II-5 | Ex. II-7 |
|---|---|---|---|---|---|---|
| Formulation (parts by weight) | | | | | | |
| Oil extended SBR (2) | 96.25 | 96.25 | 96.25 | 89.37 | 89.37 | 89.37 |
| Oil extended SBR (3) | 41.25 | 41.25 | 41.25 | 34.38 | 34.38 | 34.38 |
| Modified polyisobutylene (2) | — | — | — | 10 | 10 | 10 |
| Carbon black (2) | 80 | — | — | 80 | — | — |
| Silica (1) | — | 80 | — | 80 | — | — |
| Silica-adhered carbon black 2 | — | — | 80 | — | — | 80 |
| Silane coupling agent (1) | — | 1.5 | 1.5 | — | 1.5 | 1.5 |
| Diethylene glycol | — | 1.5 | 1.5 | — | 1.5 | 1.5 |
| Stearic acid | 2 | 2 | 2 | 2 | 2 | 2 |
| Antioxidant 6C | 3 | 3 | 3 | 3 | 3 | 3 |
| Microcrystalline wax | 1 | 1 | 1 | 1 | I | 1 |
| Aromatic process oil | 10 | 10 | 10 | 13.75 | 13.75 | 13.75 |
| Zinc oxide | 3 | 3 | 3 | 3 | 3 | 3 |
| Powdered sulfur | 1.8 | 1.8 | 1.8 | 1.8 | 1.8 | 1.8 |
| Vulcanization accelerator NS | 2 | 2 | 2 | 2 | 2 | 2 |
| Vulcanization accelerator DPG | 0.1 | 0.1 | 0.1 | 0.1 | 0.1 | 0.1 |
| Test results | | | | | | |
| Unvulcanized viscosity (Mooney viscosity) | 69 | 93 | 58 | 72 | 104 | 62 |
| tan δ (0° C.) | 0.597 | 0.567 | 0.581 | 0.628 | 0.611 | 0.623 |
| tan δ (60° C.) | 0.275 | 0.166 | 0.235 | 0.283 | 0.166 | 0.236 |

Standard Examples II-4 to II-6 are Examples of addition of three types of reinforcing agents to SBR. 10 parts by weight of the starting rubber was replaced with modified polyisobutylene in Comparative Examples II-4 and II-5 and Example II-7 of the present invention. From this, it was reconfirmed that the tan δ (60° C.) was improved without increases the unvulcanized viscosity in only the example of the present invention constituting a combination of modified polyisobutylene and silica-adhered carbon black.

Further, the present invention requires modified polyisobutylene and silica-adhered carbon black, but comparing Comparative Example II-3 of Table VIII which is a combination of ordinary diene rubber and carbon black, with Examples II-3 to II-6, Examples II-3 to II-6 of the present invention also have the defect of a poor, though only slightly poor, tan δ (60° C.) although the tan δ (0° C.) is high. This is due to the fact that the hysteresis of polyisobutylene is a high 0.2 or so near 60° C. compared with natural rubbers and SBR. On the other hand, Example II-7 of Table IX has a lower tan δ (60° C.) than Standard Example II-4 despite the addition of the modified polyisobutylene and silica-adhered carbon black and is best for a tire tread. This is believed to be because the tan δ (60° C.) of the basic formulation is at least 0.2, and therefore, the rise in the tan δ due to the modified polyisobutylene is suppressed.

I claim:

1. A rubber composition comprising 100 parts by weight of a starting rubber containing 95 to 60 parts by weight of a styrene-butadiene copolymer rubber, 5 to 30 parts by weight of a modified polyisobutylene rubber having a functional group capable of reacting with a silanol group present on a surface of silica, and optionally 0 to 20 parts by weight of another diene rubber and 5 to 100 parts by weight of precipitated silica, a tan δ at 60° C. of the composition after vulcanization being at least 0.2.

2. A rubber composition as claimed in claim 1, wherein the functional group of the modified polyisobutylene rubber is a halogen atom or an alkoxysilyl group.

3. A rubber composition as claimed in claim 1, wherein the modified polyisobutylene rubber is a modified copolymer of isobutylene and isoprene or p-methylstyrene.

4. A rubber composition as claimed in claim 1, wherein at least half of the starting styrene-butadiene copolymer rubber is an emulsion polymerized styrene-butadiene copolymer rubber.

5. A rubber composition as claimed in claim 1, wherein at least half of the starting styrene-butadiene copolymer rubber is one with a bound styrene content of at least 30%.

6. A rubber composition as claimed in claim 1, further comprising 0.1 to 10 parts by weight of a silane coupling agent based upon 100 parts by weight of the starting rubber.

7. A rubber composition as claimed in claim 1, wherein the starting rubber is composed of the styrene-butadiene copolymer rubber and the modified polyisobutylene rubber.

8. A rubber composition as claimed in claim 2, wherein the modified polyisobutylene rubber is a modified copolymer of isobutylene and isoprene or p-methylstyrene.

9. A rubber composition as claimed in claim 2, wherein at least half of the starting styrene-butadiene copolymer rubber is an emulsion polymerized styrene-butadiene copolymer rubber.

10. A rubber composition as claimed in claim 2, wherein at least half of the starting styrene-butadiene copolymer rubber is one with a bound styrene content of at least 30%.

11. A rubber composition as claimed in claim 2, further comprising 0.1 to 10 parts by weight of a silane coupling agent based upon 100 parts by weight of the starting rubber.

12. A rubber composition as claimed in claim 2, wherein the starting rubber is composed of the styrene-butadiene copolymer rubber and the modified polyisobutylene rubber.

13. A rubber composition comprising a modified polyisobutylene having a functional group capable of reacting with a silanol group present on a surface of silica and a silica-adhered carbon black.

14. A rubber composition as claimed in claim 13, where said modified polyisobutylene is an isoprene-isobutylene copolymer rubber having a halogen atom, an isobutylene-p-methylstyrene copolymer rubber having a halogen atom or a mixture thereof.

15. A rubber composition as claimed in claim 13, wherein the amount of silica of the silica-adhered carbon black is 0.1 to 25% by weight.

16. A rubber composition as claimed in claim 13, wherein, 100 parts by weight of a starting rubber comprises at least 5 parts by weight of the modified polyisobutylene and the remainder of a diene rubber.

17. A rubber composition as claimed in claim 13, wherein, as a reinforcing agent both said silica-adhered carbon black and another reinforcing agent are used in combination.

18. A rubber composition as claimed in claim 13, further comprising at least one silane coupling agent.

19. A rubber composition as claimed in claim 13, further comprising at least one polyalkylsiloxane and/or polysiloxane having an alkoxy group.

20. A rubber composition as claimed in claim 13, wherein a tan $\delta$ at 60° C. of the composition after vulcanization is at least 0.2.

* * * * *